Dec. 22, 1953 V. C. BOWSER 2,663,436

SEMIAUTOMATIC PARKING GARAGE

Filed July 12, 1949 12 Sheets-Sheet 1

INVENTOR.
Virgil C. Bowser
BY
Munn, Liddy & Glaccum
ATTORNEYS

Dec. 22, 1953 V. C. BOWSER 2,663,436

SEMIAUTOMATIC PARKING GARAGE

Filed July 12, 1949

12 Sheets-Sheet 2

INVENTOR.

Virgil C. Bowser

BY

Munn, Liddy & Glaccum

Dec. 22, 1953 V. C. BOWSER 2,663,436

SEMIAUTOMATIC PARKING GARAGE

Filed July 12, 1949 12 Sheets-Sheet 3

INVENTOR.

Virgil C. Bowser

BY

Munn, Liddy & Glaccum

ATTORNEYS

Dec. 22, 1953 V. C. BOWSER 2,663,436

SEMIAUTOMATIC PARKING GARAGE

Filed July 12, 1949 12 Sheets-Sheet 4

INVENTOR.

Virgil C. Bowser

BY

Munn, Liddy & Glaccum

ATTORNEYS

Dec. 22, 1953 V. C. BOWSER 2,663,436

SEMIAUTOMATIC PARKING GARAGE

Filed July 12, 1949 12 Sheets-Sheet 5

INVENTOR.

Virgil C. Bowser

BY Munn, Liddy & Glaccum

ATTORNEYS

Dec. 22, 1953 V. C. BOWSER 2,663,436

SEMIAUTOMATIC PARKING GARAGE

Filed July 12, 1949 12 Sheets-Sheet 6

INVENTOR.

Virgil C. Bowser

BY

Munn, Liddy & Glaccum

ATTORNEYS

INVENTOR.
Virgil C. Bowser
BY
Munn, Liddy & Glaccum
ATTORNEYS

INVENTOR.
Virgil C. Bowser
BY
Munn, Liddy & Glaccum
ATTORNEY

Dec. 22, 1953 V. C. BOWSER 2,663,436

SEMIAUTOMATIC PARKING GARAGE

Filed July 12, 1949 12 Sheets-Sheet 9

INVENTOR.
Virgil C. Bowser
BY
Munn, Liddy & Glaccum
ATTORNEY

Dec. 22, 1953 V. C. BOWSER 2,663,436

SEMIAUTOMATIC PARKING GARAGE

Filed July 12, 1949 12 Sheets-Sheet 10

INVENTOR.
Virgil C. Bowser
BY
Munn, Liddy & Glaccum
ATTORNEY

Dec. 22, 1953 V. C. BOWSER 2,663,436

SEMIAUTOMATIC PARKING GARAGE

Filed July 12, 1949 12 Sheets-Sheet 11

INVENTOR.
Virgil C. Bowser
BY
Munn, Liddy & Glaccum
ATTORNEYS

Dec. 22, 1953

V. C. BOWSER 2,663,436

SEMIAUTOMATIC PARKING GARAGE

Filed July 12, 1949

12 Sheets-Sheet 12

INVENTOR.

Virgil C. Bowser

BY

Munn, Liddy & Glaccum

ATTORNEYS

Patented Dec. 22, 1953

2,663,436

UNITED STATES PATENT OFFICE 2,663,436

SEMIAUTOMATIC PARKING GARAGE

Virgil C. Bowser, Silver Spring, Md., assignor to Bowser Engineering Company, Baltimore, Md., a corporation of Maryland Application July 12, 1949, Serial No. 104,239

13 Claims. (Cl. 214—16.1)

The present invention relates to improvements in automatic parking garages of a type constructed with a plurality of floors having storage stalls or spaces and elevator means for depositing automobiles in a predetermined stall on any of the various levels, and is a continuation in part of my copending application S. N. 758,561 filed July 2, 1947, now Patent No. 2,511,619.

The object of my present invention is the provision of a simply constructed automobile parking garage having means to rapidly deliver automobiles, between a delivery point and a storage space, assuring undelayed and accurate parking service in congested metropolitan areas.

Another object of my invention is to provide a parking garage elevator system with an independently motivated traveling crane having a suspended lift framework thereon and an elevator guided within the lift, the traveling crane and elevator operating simultaneously to provide diagonal motion of a conveyed automobile effecting travel of the shortest distance from a pick-up point on the ground floor to any predetermined parking stall in the garage.

A further object of the invention is to provide an automobile delivery means wherein the driving means for vertical movement of the elevator is stationary and the driving means for the crane is carried by and movable with the crane.

Still another object of my invention is to present an automobile delivery means where predetermined lateral and vertical movement is simultaneously effected by operation of a single electrical contact button located on a panel in the elevator car.

A further object of the invention is the provision of a parking garage elevator having a gate lifting means actuated by the operator for automatically lifting the elevator door and the gate of a parking stall to be used and simultaneously braking the electrical circuit to prevent movement of the elevator car while the gate is in a raised position.

Still another object of my invention is to provide a parking garage elevator system having interrelated stub panels in the elevator car and at the cashier's office whereby insertion and removal of receipt stubs control an electrical circuit to provide a visual annunciator system for facilitating rapid and accurate delivery of automobiles.

To these and other ends my invention comprises further improvements as will be further described in the accompanying specifications, the novel features thereof being set forth in the appended claims.

In the drawings.

Similar reference characters in the various figures represent similar parts.

At the present time the off street parking situation in congested parking areas has become a considerable municipal and industrial problem. The high cost of land in valuable commercial localities, and the relative high cost of construction per parking space in the present type of automobile parking garages has discouraged endeavors to cope with the parking situation. In order to meet this problem my invention contemplates the construction of a multiple story building having oppositely disposed book-case-type arrangements of parking spaces separated by a shaft running lengthwise of the building. In this shaft I provide an elevator car which is adapted to move in a vertical, horizontal, or diagonal direction to a predetermined location with the depression of a single push button. Such a construction provides means for meeting the unique requirements of transient parking in congested areas by affording a large number of spaces in which automobiles can be parked with protection from the elements of weather and rapidly parked or delivered, the maximum time for such operation of any car being but one minute.

Figure 1:
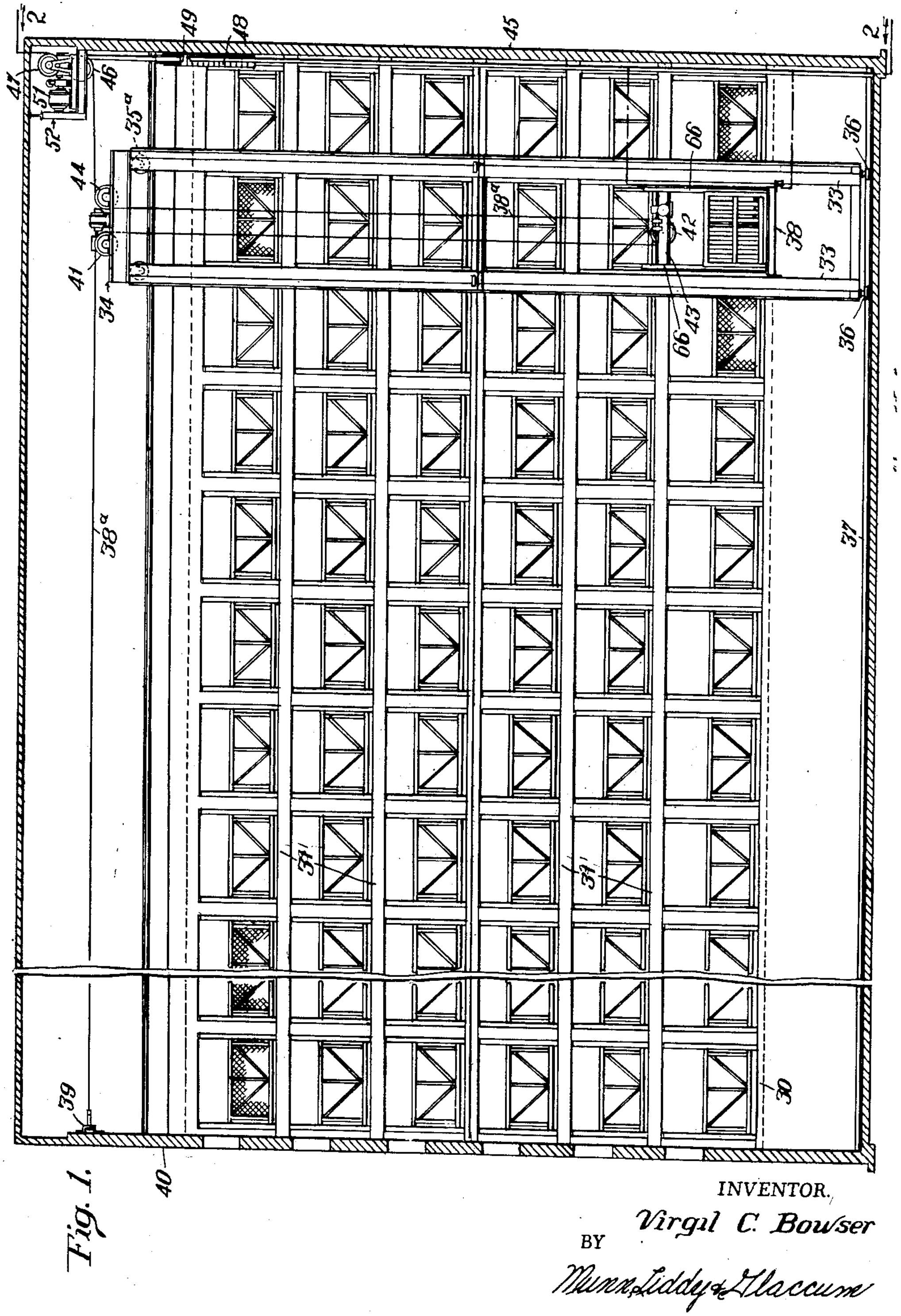
Figure 1 is a vertical sectional view of my parking garage taken along line 1—1 of Fig. 2.
Figure 2:
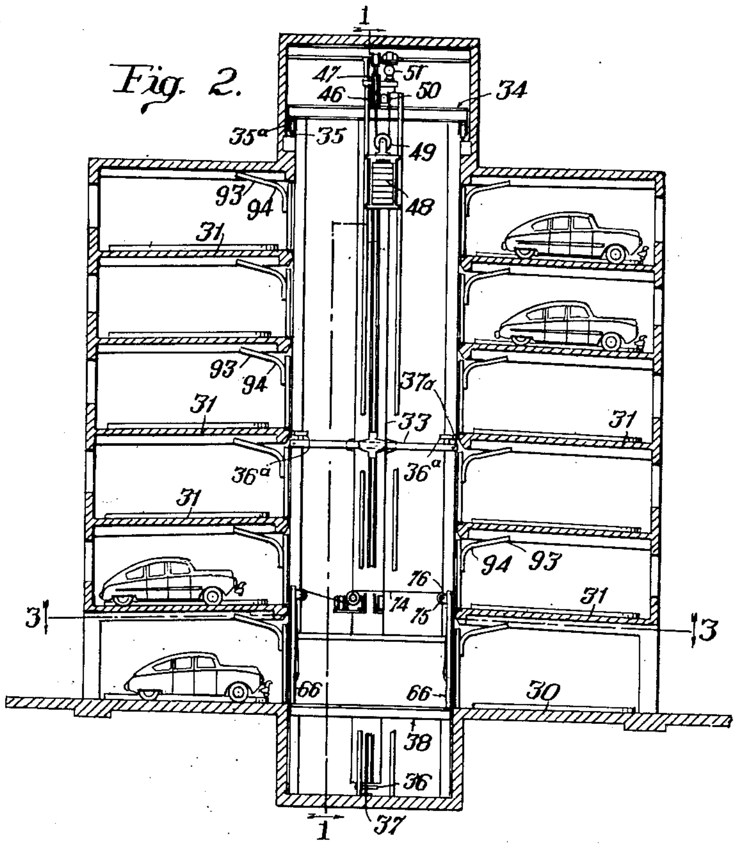
Figure 2 is a vertical sectional view of the garage taken on line 2—2 of Fig. 1.
Figure 3:
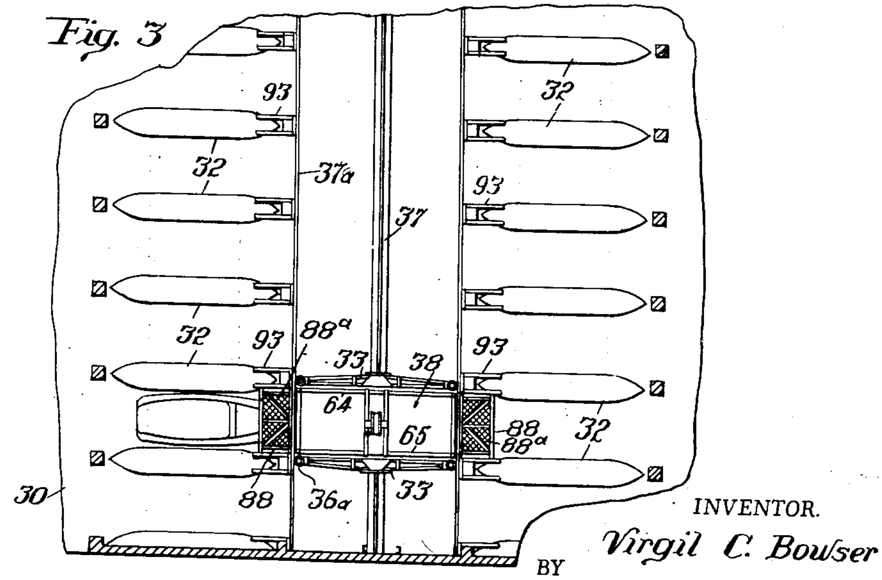
Figure 3 is a horizontal sectional view taken on line 3—3 of Fig. 2.

While for the purpose of illustration I have shown in the accompanying drawings a building comprising six floors, it will be understood that, if desired, my garage may be constructed to efficiently operate with ten or twelve floors. As seen in Figs. 1 and 2 the building consists of a ground floor 30 which contains a plurality of unrestricted entrance spaces defined by curbings 32 spaced throughout the length of the building. Above the ground floor are located successive parking floors or levels 31 which contain a number of individual parking spaces or stalls positioned side by side in vertical alignment with the entrance spaces on the ground floor. There are stalls positioned on each side of the elevator well on each floor as clearly shown in Figures 2 and 3. The stalls on each side are each respectively in alinement with the corresponding stall on the opposite side of the well. Two such horizontally alined stalls are in what might be termed a stall location. There are thus a number of stall locations on each floor. The stall locations on each floor are vertically alined with the corresponding stall locations on the other floors. The vertically alined stall locations may be termed stall columns or tiers. The garage, as seen in Fig. 2, consists of parking floors of sufficient depth to accommodate a single automobile on each side of the elevator shaft, but if desired the size of the building can be increased so that more than one automobile may be placed in each stall. By so lengthening each stall the cars to be parked for a long period of time, such as an entire work day, can be placed in the stall first and moved forward to provide sufficient storage space for transient or short time parking needs. It will be seen from Fig. 2 that the parking floors are inclined slightly upwardly to the center line of the building for apparent mechanical and fire safety.

Between the oppositely disposed parking sections of the building is provided a laterally elongated shaft area or hatchway which will accommodate a moving elevator guide frame 33 to be used in depositing automobiles in the various parking spaces and returning the same when called for by the owners.

The framework 33 is suspended from a movable crane 34 which is adapted to traverse the length of the building on the support rails 35 on which the crane wheels 35ª ride. The bottom of the elevator framework carries two pairs of guide wheels 36 which bear against the opposite sides of a guide rail 37 located at the bottom of the hatchway and coincident with the center line thereof, such arrangement assisting to prevent transverse movement of the framework when automobiles are driven on and off the elevator car.

The elevator framework is prevented from lateral whipping by means of stabilizing cables (not shown), described in detail in my co-pending application S. N. 758,561. This stabilizing arrangement synchronizes the movement of the top and bottom ends of the framework and prevents unnecessary sway or whip of the lower end of the guide frame which would customarily be experienced due to the length of the suspended framework.

Additional rigidity is afforded the shaft framework by means of wheels 36ª (shown in Figs. 3 and 5), which are located in oppositely disposed pairs at any desired point or points of elevation on the framework and which contact horizontal guide rails 37ª located along the edge of various intermediate parking floors in alinement with the wheels. This wheel and guide rail arrangement transversely stabilizes the mid section of the elevator guide frame and the number of such arrangements will obviously be determined according to the relative height of the guide frame desired. A more complete description of this intermediate stabilizing means is set forth in my above-mentioned co-pending application.

Figure 4:
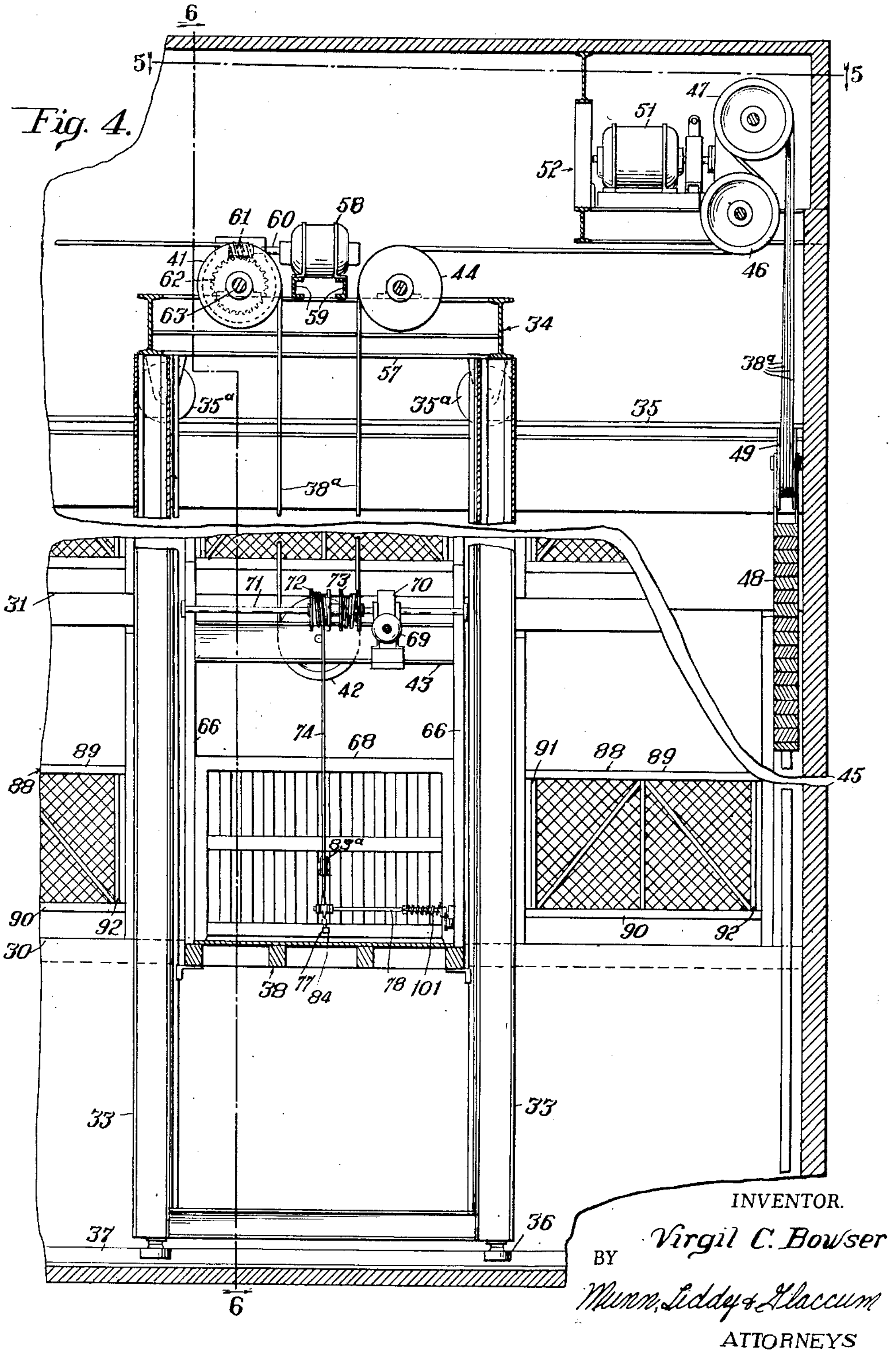
Figure 4 is an enlarged fragmentary view of the elevator and its driving means as shown in Fig. 1.
Figure 6:
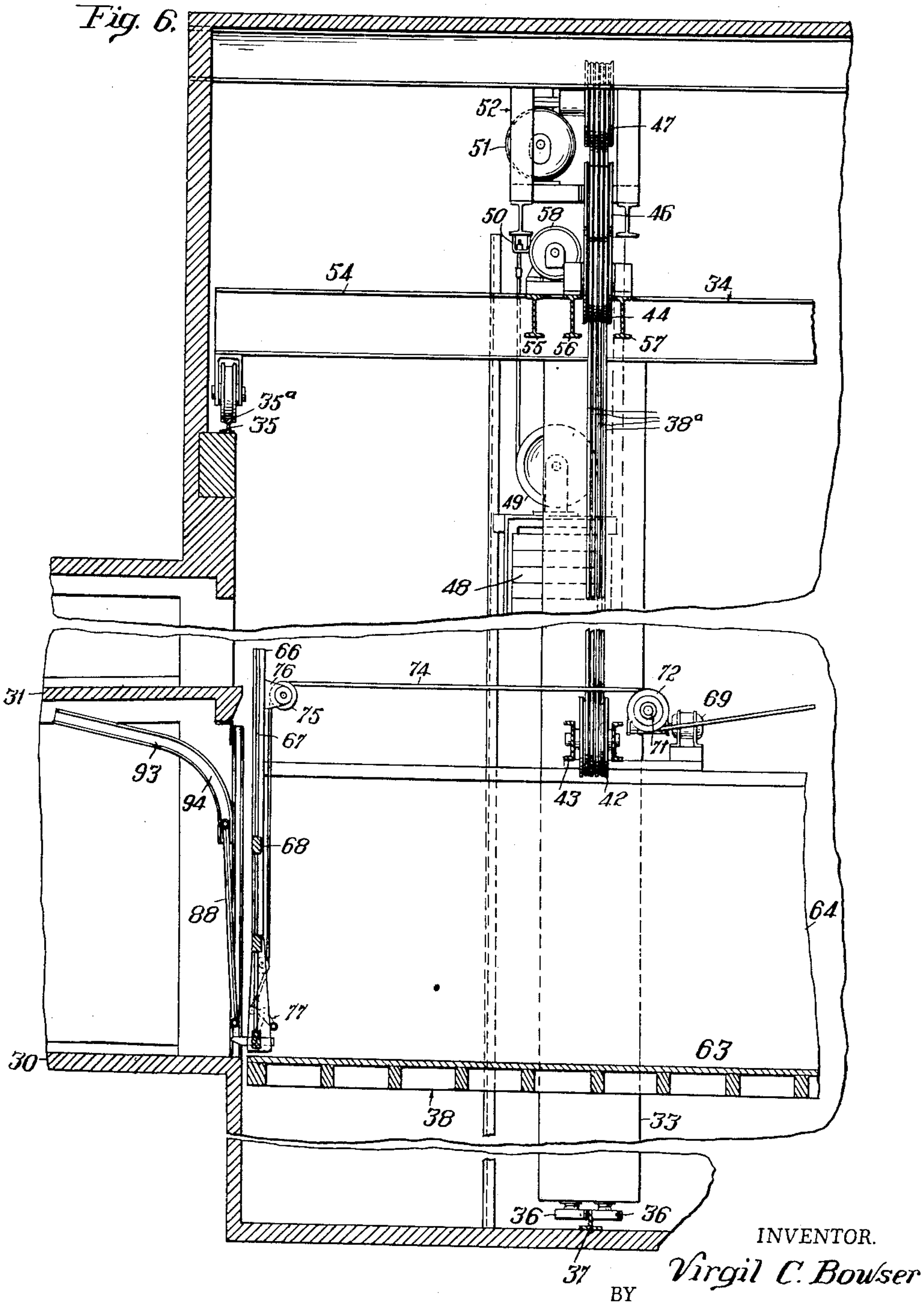
Figure 6 is a fragmentary sectional view taken on line 6—6 of Fig. 4.

As best seen in Fig. 1 the elevator guide frame 33 houses a substantially open elevator car generally designated at 38. This car is guided within the opposing "T-sections" of the framework 33 being vertically movable by hoist cables 38ª which are preferably at least four in number for safety reasons. One end of each cable 38ª is secured as shown at 39 to an end wall 40 of the building. The cables 38ª pass over a multi-grooved sheave 41 and descend to pass under and support a similar sheave 42 pivotally carried by a pair of transverse I-beams 43 forming the crosshead at the top of the elevator car. The sheave 42 reverses the direction of the cables which then ascend and pass over another sheave 44 at the top of the movable crane, as best seen in Figs. 1 and 4. The cables then proceed to the opposite wall 45 of the building where they are encountered by a freely journaled sheave 46 and a drive sheave 47 and continue downwardly along the wall 45 to support a counterweight 48 by means of a multi-groove sheave 49 secured to the top of the counterweight. The free end of each of the cables 38ª is then bolted to a channel anchor 50, as shown in Fig. 6. The drive sheave 47 is rotated by a reversible motor 51 (Fig. 4), the entire mechanism being carried by a stationary I-beam framework 52 conveniently located above the hatchway at the intersection of the roof of the building and the end wall 45.

As best seen in Figs. 1 and 4, upon rotation in one direction of the drive sheave 47, the existing length of the cables 38ª between the walls of the building is shortened which automatically lifts the sheave 42 and raises the elevator car within the elevator guide frame. The load of the driving motor 51 in raising the elevator car is lightened by means of the counter balance 48 which simultaneously descends along the wall of the building with the ascent of the elevator car. Reverse movement of the motor 51 acts to pay out the cables 38ª between the end walls of the building thereby permitting the elevator car 38 to descend within the guide frame.

Figure 5:
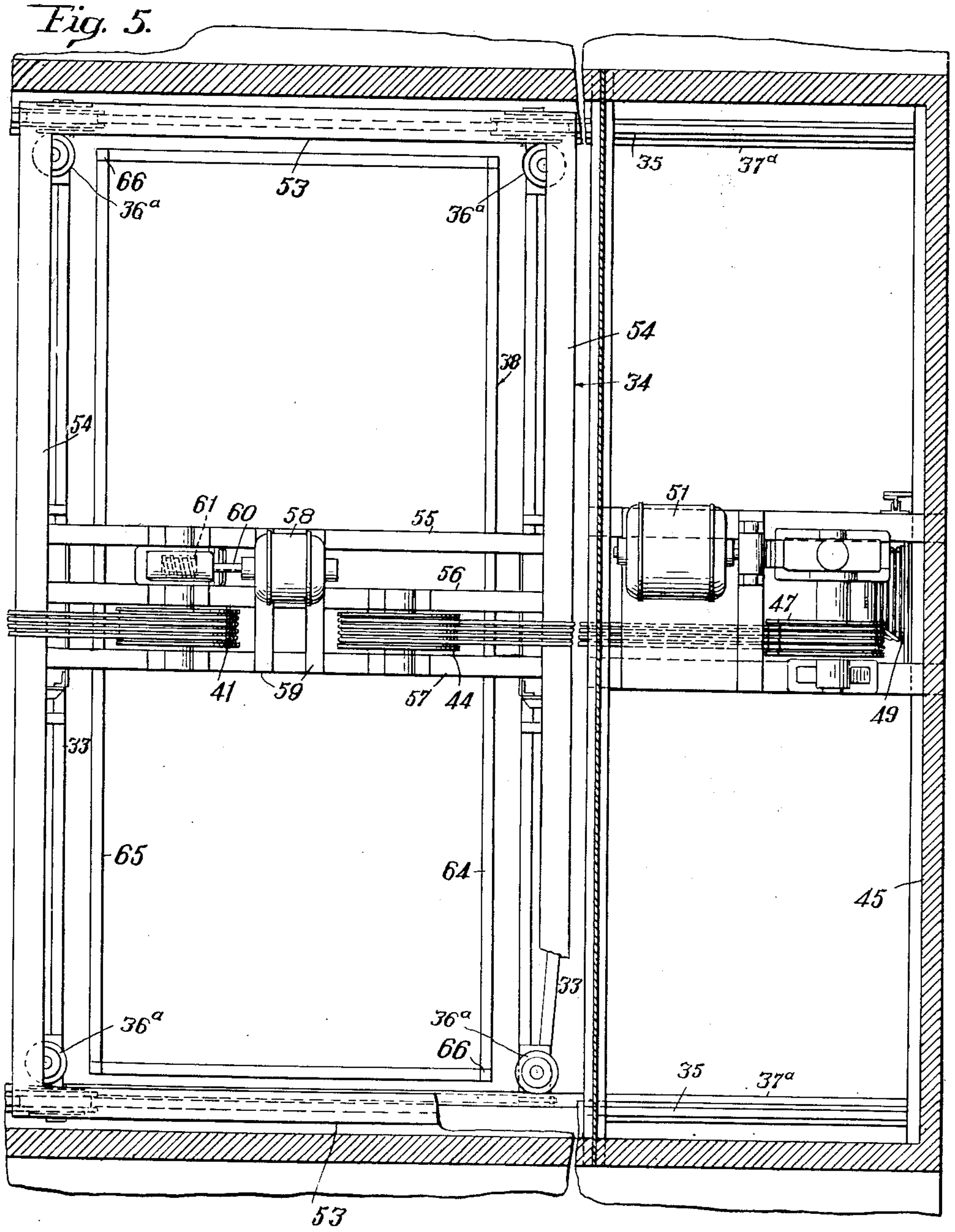
Figure 5 is a fragmentary sectional view taken on the line 5—5 of Fig. 4.

As previously stated the elevator guide frame 33 is movably carried by a horizontal crane structure 34 consisting of a rectangular arrangement of I-beams, as shown in Fig. 5. The short end I-beams 53 run parallel to the length of the building and determine the desired width of the elevator guide frame. These are connected at their ends by means of transverse I-beams 54 which in turn have their middle sections connected by three parallel I-beams 55, 56 and 57 perpendicular to I-beams 54. The parallel I-beams 55, 56 and 57 form a support for the previously mentioned sheaves 41 and 44 and also for the driving mechanism necessary to produce lateral movement of the crane. This driving mechanism consists of a reversible motor 58 mounted on transverse channel brackets 59. To the end of the drive shaft 60 of this motor is connected a worm 61 (Fig. 4) which engages a worm wheel 62 keyed to a transverse shaft 63 upon which is in turn keyed the sheave 41. Actuation of the motor 58 in one direction will rotate the sheave 41 in a counterclockwise direction and due to traction resulting from the weight of the elevator car the sheave will progress to the right, as viewed in Fig. 4, thereby moving the crane and the entire elevator framework in that direction. Reverse movement of the motor 58 will produce the opposite result and cause the elevator assembly to move to the left.

The simultaneous activation of motors 51 and 58 will cause both vertical movement of the elevator car 38 within the guide frame and lateral movement of the crane assembly 34 and the suspended guide frame 33. This simultaneous movement allows the automobile conveyed by the elevator car to assume diagonal motion which is the resulting component of the above mentioned vertical and horizontal movement. This feature obviously allows the elevator car to progress from one point or stall location to another in the building by means of the shortest distance between those two points and thereby save considerable time in the parking and delivery of the automobiles.

The elevator car 38 which is carried by the suspended guide frame 33 comprises a reinforced platform section 63 and vertical side panels 64 and 65. These side panels are supported by end posts 66 located at each of the four corners of the floor platform 63 and each of which have grooved runways 67 on the inner surface thereof i. e. that surface which faces the longitudinal center line of a car. A car gate 68 is supported by each pair of corner posts and is adapted to be guided in vertical movement by the grooves 67 of each pair of opposing posts. The gates 68 are simultaneously raised or lowered by the force of a reversible motor 69 carried by the transverse crosshead 43 previously mentioned. The motor 69 is controlled by a pair of push buttons located on the instrument panel within the elevator car. The drive spindle of the motor 69 actuates the housed gear mechanism 70 which in turn drives a transversely journaled shaft 71. Keyed to the shaft 71 are juxtaposed cable drums 72 and 73 or other means of drive. Upon each of these drums is wound a length of cable or other flexible means utilized in raising one of the gates 68.

Figures 7, 8:
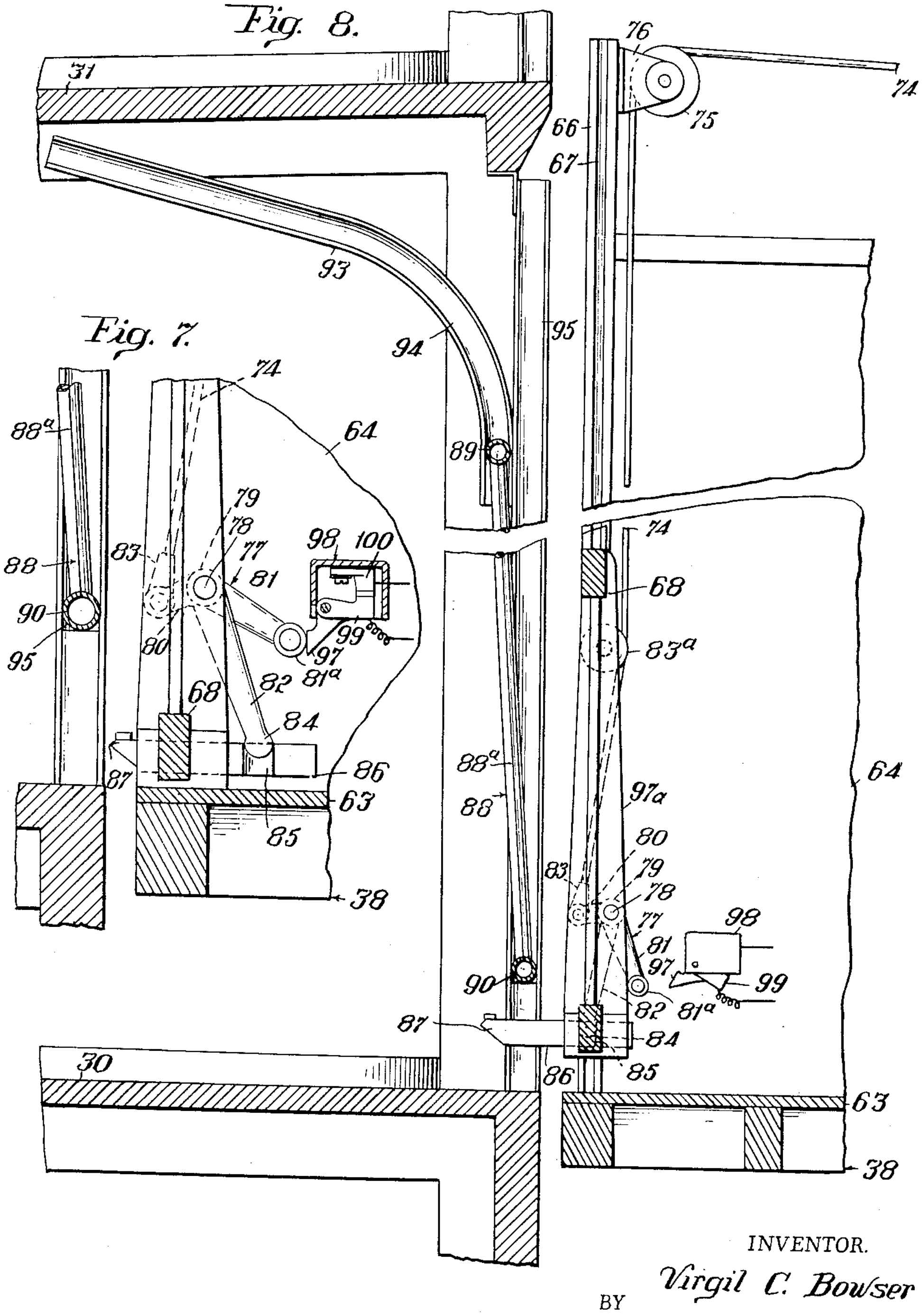
Figure 7 is a fragmentary view showing the gate raising dog in its detracted position to enable movement of the elevator.
Figure 8 is an enlarged fragmentary view of my automatic gate raising mechanism.
Figures 9, 10:
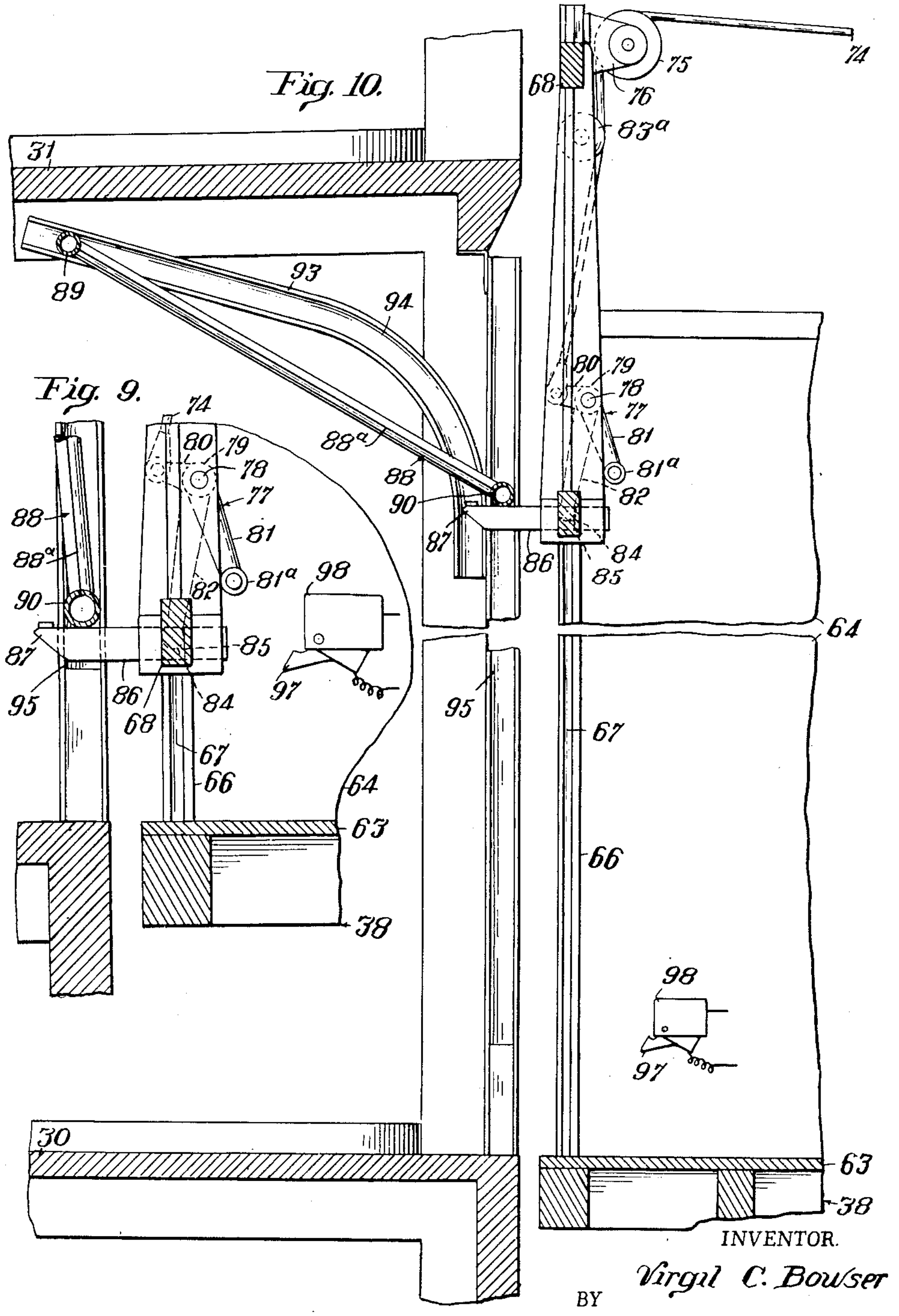
Figure 9 is a fragmentary view similar to Fig. 7, but showing the gate raising dog in an advanced position for lifting contact with a stall gate.
Figure 10 is a fragmentary view of the gate raising mechanism and showing the stall gate in its raised position.
Figure 12:
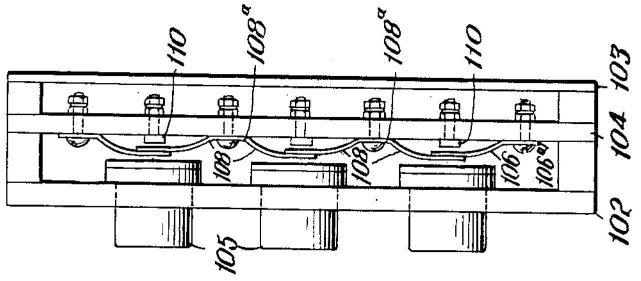
Figure 12 is a right side elevation of the panel portion shown in Fig. 11.

As best seen in Figs. 6, 8 and 10 the cable 74, which is wound on the drum 72 (Fig. 4), travels horizontally from said drum to contact a pulley 75 rotatably secured to the frame of the car by means of brackets 76. At this point the cable 74 is turned downwardly by pulley 75 and is secured at the lower end of the car gate 68 to a toggle arm generally designated at 77. The toggle 77 is pivotally connected to the gate frame by means of a shaft 78 passing through a hub 79 of the toggle. Integral with this hub are projecting arms 80, 81 and 82. The arm 80 has at the free end thereof a pivotally connected clamping socket 83 which firmly holds the end of cable 74 which passes over an intermediate supporting pulley 83ᵃ. The substantially vertical arm 82 is formed with an enlargement 84 on the end thereof which cooperates with an aperture 85 located in the lifting dog 86, as seen in Fig. 7. The enlargement 84 projects into the aperture 85 to form a connecting arrangement which enables the horizontal movement of the dog 86 which is slidingly engaged in a mating aperture at the bottom of the gate 68.

In Fig. 7 the gate raising dog 86 is shown in the detracted position which it assumes during vertical or horizontal movement of the elevator system. When the elevator reaches a selected parking space the "Up" button on the instrument panel is depressed thereby causing the motor 69 to rotate the cable drum and wind the gate cable 74. The vertical movement of the operating end of the cable 74 causes the toggle arm 80 to be raised which produces a clockwise movement (as viewed in Fig. 7) to the toggle arm and consequently moves the enlarged end 84 of the arm 82 to the left causing the end 87 of the dog 86 to project outwardly beyond the elevator car and at the same time extend under the lower edge of a parking stall hatchway gate 88. A gate 88 is located at the entrance of each parking stall throughout the building. Each gate consists of a framework composed of hollow metal pipe and covered with conventional wire mesh 88ᵃ, or such other substance as may be desired. The upper and lower boundaries of the hatchway gate frame are formed by pipe sections 89 and 90. These parallel sections 89 and 90 extend beyond the vertical side members 91 and 92 to provide guide lugs for the gate. The lugs formed by the end of the upper pipe 89 are guided within oppositely disposed channel members 93 which have an arcuate portion 94, as shown in Figs. 8 and 10. The projecting lugs of the lower member 90 are guided in a vertical path by the channel members 95 which are perpendicular to the floor of the parking stall and located at each side of the entrance thereto. This arrangement of guideways permits the hatchway gate to be raised from a substantially vertical position, in its normal closing use, to a substantially horizontal position at the top of the entrance, thereby facilitating proper clearance to enable an automobile to be driven to and from the parking space.

Referring once again to the gate raising dog, shown in Fig. 7, it will be seen that when the dog has been fully extended to the position shown in Fig. 8 a projection 81ᵃ on the toggle arm 81 will abut against the vertical stud 97ᵃ on the elevator car gate and prevent further clockwise movement of the toggle assembly. At this time continued winding of the gate cable 74 will create a lifting force on the pivot pin 78 of the toggle assembly and cause the elevator car gate to move upward, as shown in Figs. 9 and 10. The upward movement of the elevator gate carries the dog 86 with it which in turn forces the lower end of the hatchway gate upward. At the same time the upper pipe 89 of the gate is forced along the guideway 93 until the elevator door and the hatchway gate have reached the raised position shown in Fig. 10. This position provides sufficient clearance to enable the elevator operator to remove the automobile from the elevator car, or the parking space, as the case may be.

Referring to Fig. 7 in the drawings, it will be noted than when the gate lifting dog 86 is in its detracted position the end $81^a$ of toggle arm 81 contacts a toe 97 of an electrical circuit breaker, shown generally at 98. In this position the horizontal member 99 of this toggle switch is in contact with a terminal member 100 to close the electrical circuits controlling the operating mechanism for movement of both the elevator car and the movable crane.

When the gate cable 74 begins to wind on drum 72 the toggle arm 81 is moved in a clockwise direction away from the circuit breaker 98 and the contact between the toggle member 99 and the terminal 100 is broken thereby preventing movement of the elevator car or the crane. This feature is essential since for obvious safety reasons it would be undesirable for there to be any possibility of the elevator assembly moving except when the elevator car gate and the hatchway gate are completely in a closed position.

When the motor 69 is reversed by depressing the "Down" button on the instrument panel in the elevator car the car gate is automatically lowered by its own weight permitting the hatchway gate to likewise descend and upon reaching the bottom of the guideway 67 a spring member 101 (Fig. 4) rotates the shaft 78 to bias the toggle member 77 to its original position whereby member 77 contacts the switch toe 97 closing the operating circuit and the elevator car may then be moved to its next destination.

The simultaneous movement of the elevator car in a vertical direction and the crane in a horizontal direction is effected by a motor control circuit actuated by means of the push button panel shown in Figs. 11, 12, 13 and 19 in the drawings. This instrument panel consists of an outer base plate 102, a backing panel 103 and an intermediate terminal panel 104. The intermediate panel has fixed thereto a plurality of electrical contact terminals as will be explained in greater detail hereafter. Base plate 102 contains a plurality of symmetrically arranged apertures through each of which projects a spring-biased push button 105. Each of these push buttons is labeled with the numeral designating a specific parking stall location within the garage space.

Figure 11:
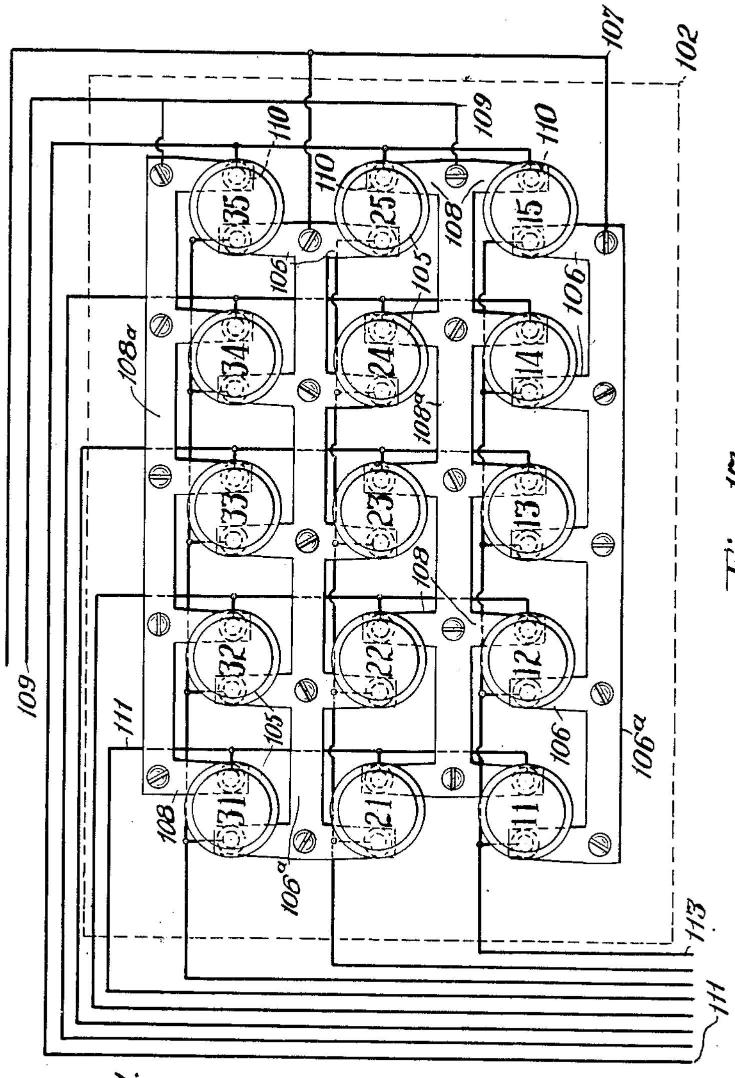
Figure 11 is a diagrammatic view showing a portion of the elevator control panel.
Figure 13:
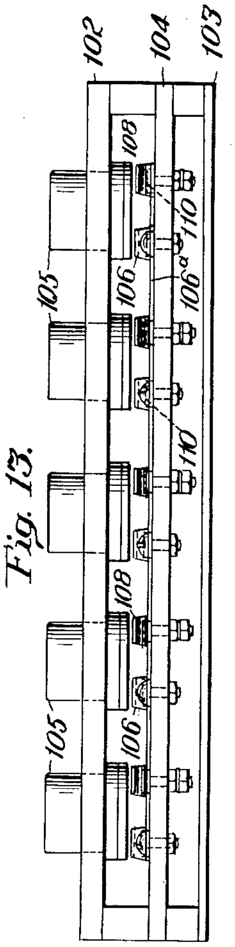
Figure 13 is a bottom view of the panel portion shown in Fig. 11.

As best seen in Fig. 11, in back of each push button there lies a contact arm 106 projecting from a bus bar $106^a$ which is in turn connected to a common feeder line 107. Also in back of each button there lies a contact arm 108 projecting from one of the common bus bars $108^a$ which are in turn connected to a common feeder line 109. In back of each contact arm there is positioned a terminal member 110 to enable the closing of the circuit when its corresponding push button is pressed inwardly. In back of each of the push button contact arms projecting from common bus bar $108^a$ there is a terminal member 110 which is connected to a stall column or tier relay for actuating movement of the elevated crane to a specific stall tier. In back of each contact arm projecting from common bus bars $106^a$ there is a contact, such as 110, which is connected to a floor level relay for actuating movement of the elevator car to a specific floor.

Figure 14:
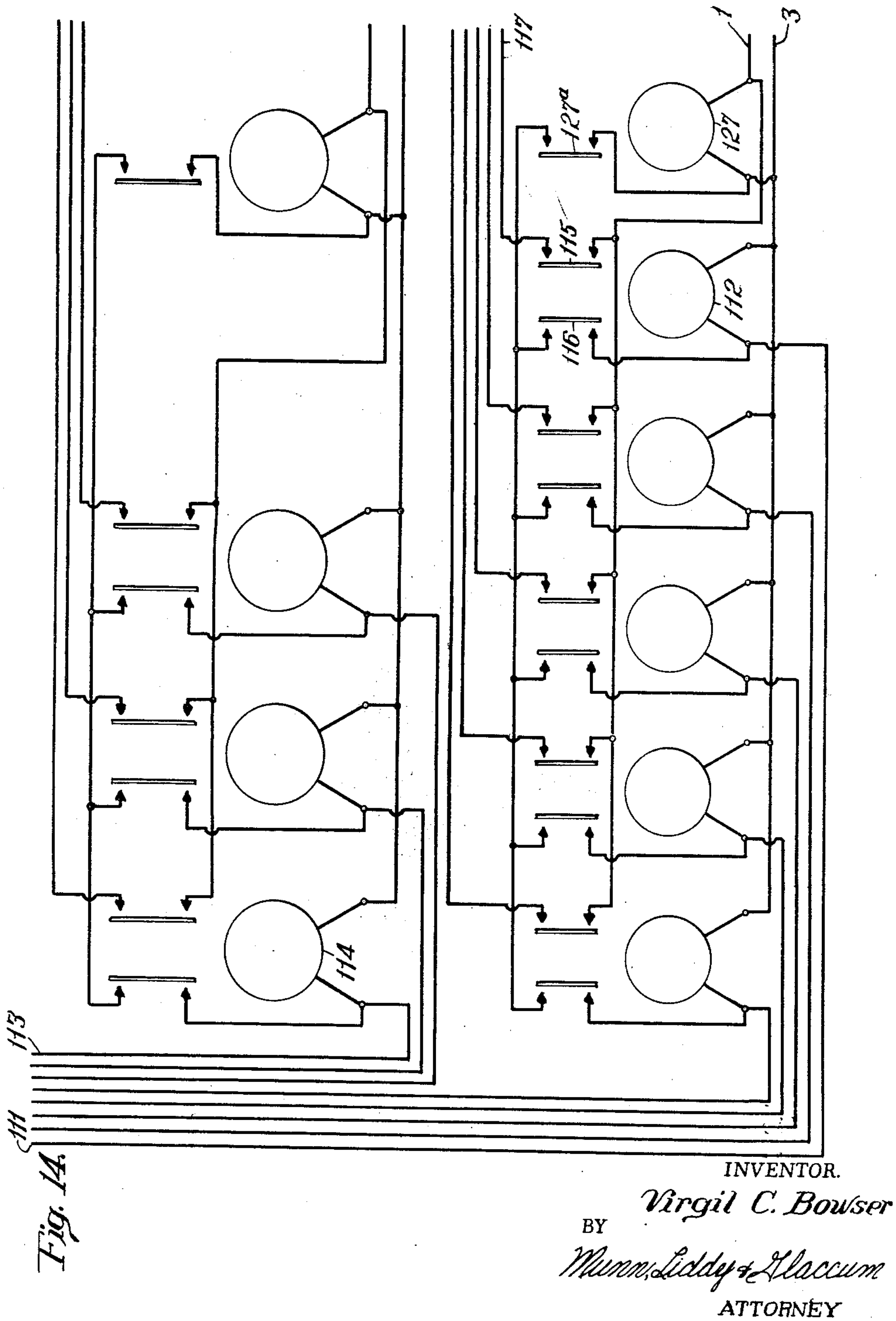
Figure 14 is a diagrammatic view of the electrical relay system for the circuit controlled by the panel in Fig. 11.
Figure 15:
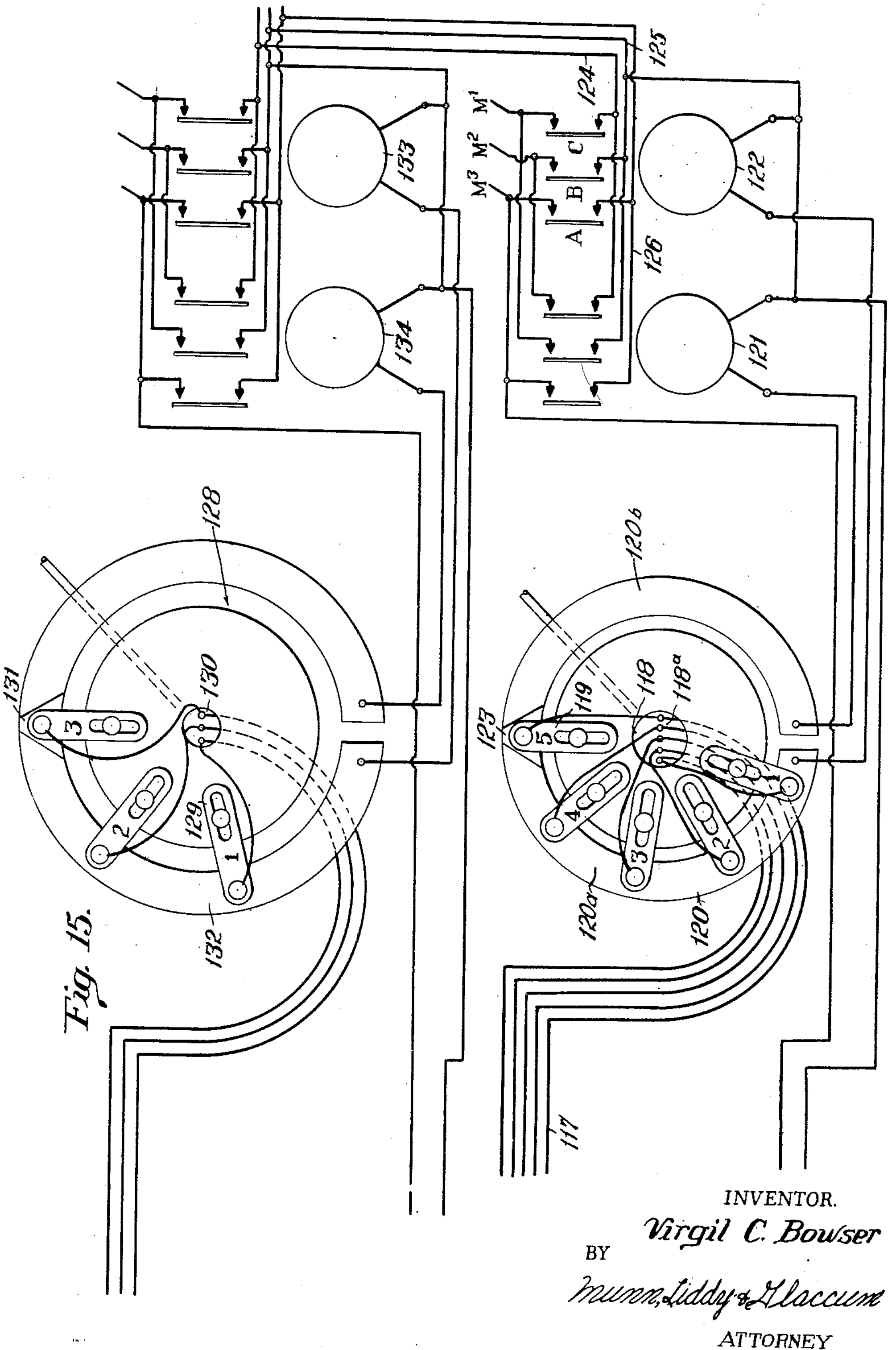
Figure 15 is a diagrammatic view of the vertical and horizontal position selectors controlled by the panel circuit shown in Figs. 11 and 14.

For purposes of illustration the circuit utilized for actuation of the drive motors in order to displace the elevator car to the parking stall "15" (located on the first floor and in vertical alinement with what may be termed the fifth stall section from the end of the building) will be traced, it being understood that the actuation of the motors by each of the various push buttons is similar in principle. The depression of button "15" completes the contact between line 111 and the common bus bar $108^a$ to energize the fifth stall relay 112, shown in Fig. 14. At the same time depression of button "15" completes the contact between the line 113 and the common bus bar $106^a$ to energize the first floor relay 114. The operation will be traced from the above mentioned fifth stall relay 112, it being understood that the first floor relay operates through a similar series of operations. When the fifth stall relay is energized the motor contacts and the stick contact, designated at 115 and 116 respectively, are closed. The object of the stick relay is to provide a stick circuit for the fifth stall relay which will keep this relay energized throughout the entire operation.

From the motor contact may be traced the lead 117 through sleeve 118 of a conventional rotating selector $118^a$ to a contact arm 119 which rides on a split ring 120 of the selector mechanism. The contact between arm 119 and the ring 120 continues the current to either the right direction crane motor relay 121 or the left direction motor relay 122 depending upon which side of the insulated stop section 123 contactor 119 is situated. If for instance the contact arm is on the left direction element $120^a$ of the split ring the left direction crane motor relay 121 is energized the common being to line 125 of the three phase current.

The rotation of the selector arm 119 is controlled by a suitable connecting means (not shown) between the center sleeve 118 and the building. When the car has reached the lateral position, corresponding to the location of the stall, the contact arm 119 will automatically have been rotated to a position above the insulator section 123 at which time the circuit will be broken and crane drive motor 58 will cease to operate. When the left direction crane motor relay 122 is energized contacts A, B, C are picked up closing the circuit lines $M^1$—$M^2$—$M^3$ and energizing the crane motor. This brings current from lines 124, 125, 126 to the leads $M^1$—$M^2$—$M^3$ respectively. It is to be understood that this or any other standard means of floor selection may be used.

Returning to the stick circuit and its component parts, it will be noted that when the motor relay is energized current is permitted to pass through the hold-in relay 127 and when its contact is closed the current will pass from line 1 to line 3 by way of the energized hold-in relay which will close its contact $127^a$. The stick contact being closed current will flow therethrough to the fifth stall relay keeping it energized and returning to line 3. This happens instantaneously and, therefore, the circuit is at all times energized.

A duplicate mode of simultaneous operation is used to energize and keep energized the various floor relays of which first floor relay 114 is energized with a depression of button 15. A similar rotor selecting means, generally designated at 128 is utilized to limit the upward and downward movement of the elevator car within the shaft framework, the selector arm 129 being correctly synchronized to the vertical movement of the elevator car through a connecting means (not shown) between its center shaft 130 and the elevator car will be positioned above the insulated stop section 131 when the elevator car has reached the first floor level.

The contact between the selector arm 129 and its associated split ring 132 selectively energizes a down direction elevator motor relay 133 or an up direction of the motor relay 134 depending upon which side of the insulator stop section the selector arm is located.

As seen from the above description the elevator drive motor and the crane drive motor are independent as to their electrical circuits, and the operation of each in no manner depends electrically upon any influence from the other.

It is also seen that there is a separate push button for each stall location in the building. By pressing a single button bearing an identification symbol for a particular stall location, the proper floor relay is actuated as is the proper stall tier relay. The vehicle carrying car is thus brought to alignment with a particular stall tier, and a particular floor. By virtue of such positioning the car is in alignment with a particular stall location having both front and rear parking stalls which may be of a length to store one or more vehicles.

Figure 16:
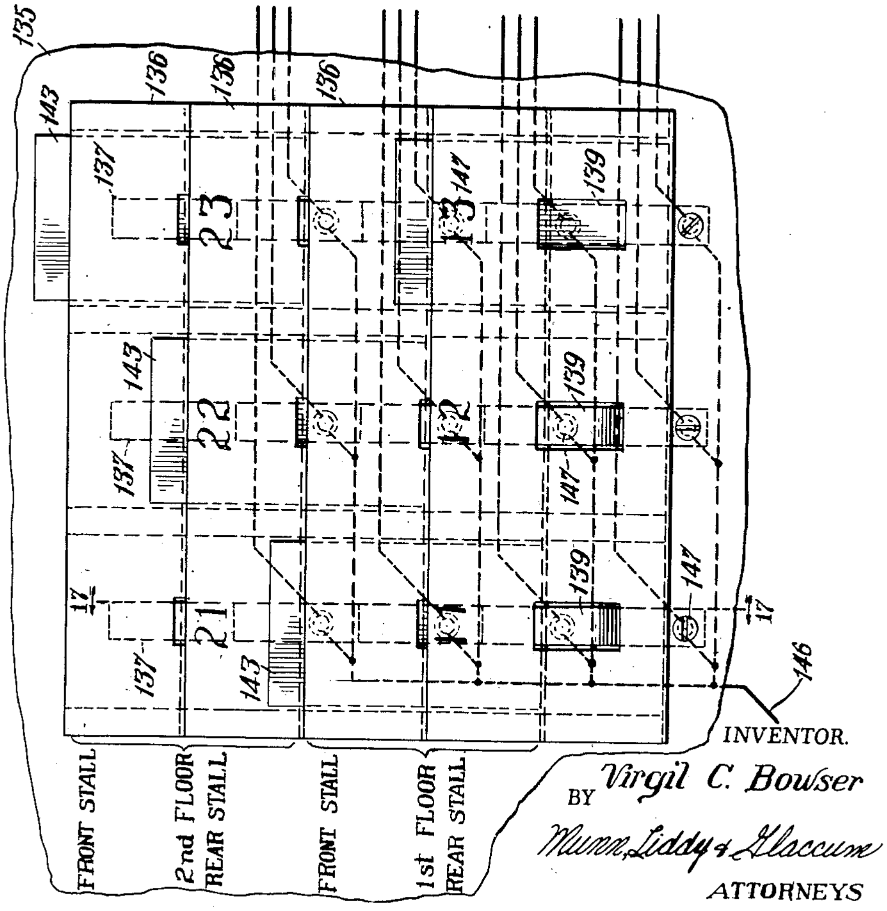
Figure 16 is a diagrammatic view of the stub panel to be located in the cashier's office.

In Figs. 16 to 19 I have shown the novel annunciator or signal system to be used in connection with my parking elevator. A stub panel 135 shown in Fig. 16 is conveniently located on one wall of the cashier's office. This panel consists of successive tiers of inclined face plates 136 which are formed into small open compartments adapted to receive a stub torn from parking tickets. Each compartment represents a different parking stall and is properly labeled by means of the legend printed at the side of the panel, as shown in Fig. 16. In each compartment there is located a contact arm 137 of a preferred metallic substance such as spring steel. Each arm is rigidly secured to the outer face of the above plate by a rivet or similar means 138 and is formed with a bent mid section 139 to provide a spring tension utilized for normally holding an end contact tab 140 in engagement with a mating terminal 141. The bent mid section for the contact arm in its normal position extends through a rectangular opening 142 in the face plate of the compartment and permits the opposing contact tabs 140 and 141 to assume a normally closed position.

Figures 17, 18:
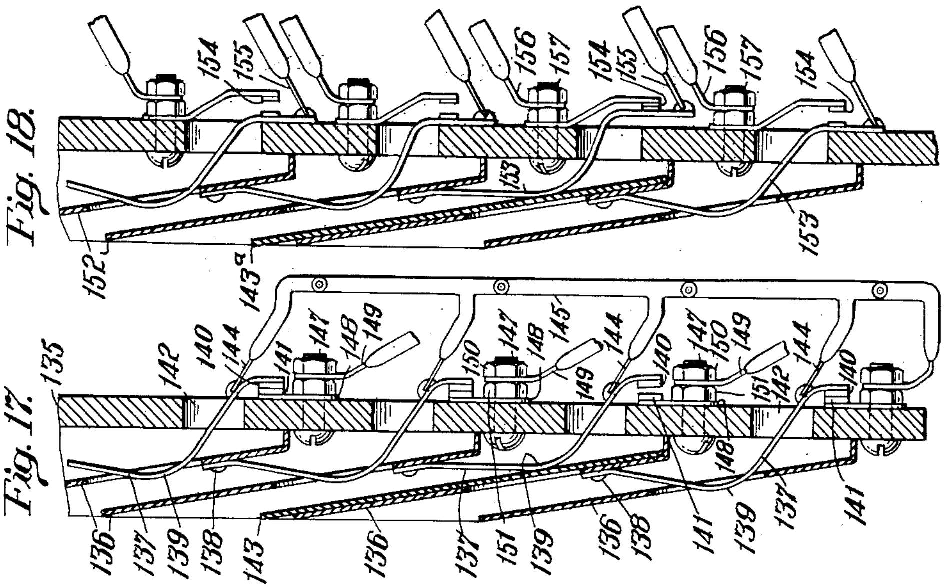
Figure 17 is a sectional view taken on line 17—17 of Fig. 16.
Figure 18 is a sectional view taken on line 18—18 of Fig. 19.

However, when a stub 143 is inserted in a desired compartment the lower end of the stub wedges between the face plate and contact arm to force the latter out of the opening 142 and consequently breaks the contact between the tabs 140 and 141, as shown in Fig. 17. To the upper surface of each contact arm 137 is soldered a lead line 144, each of these leads being connected to a common bus bar 145 which is in turn connected to the common line 146 (Fig. 16) which supplies the necessary current for the signal circuit. Each contact tab 141 is connected to a terminal bolt 147 by means of a conducting plate 148. The terminal bolt is secured to the base 135 of the panel and is adapted at its outer end to rigidly hold in place an apertured lead 149. This lead is secured between opposing terminal nuts 150 and 151 and each is connected to a separate line to convey current to a cooperating stub panel to be located in the elevator car.

Figure 19:
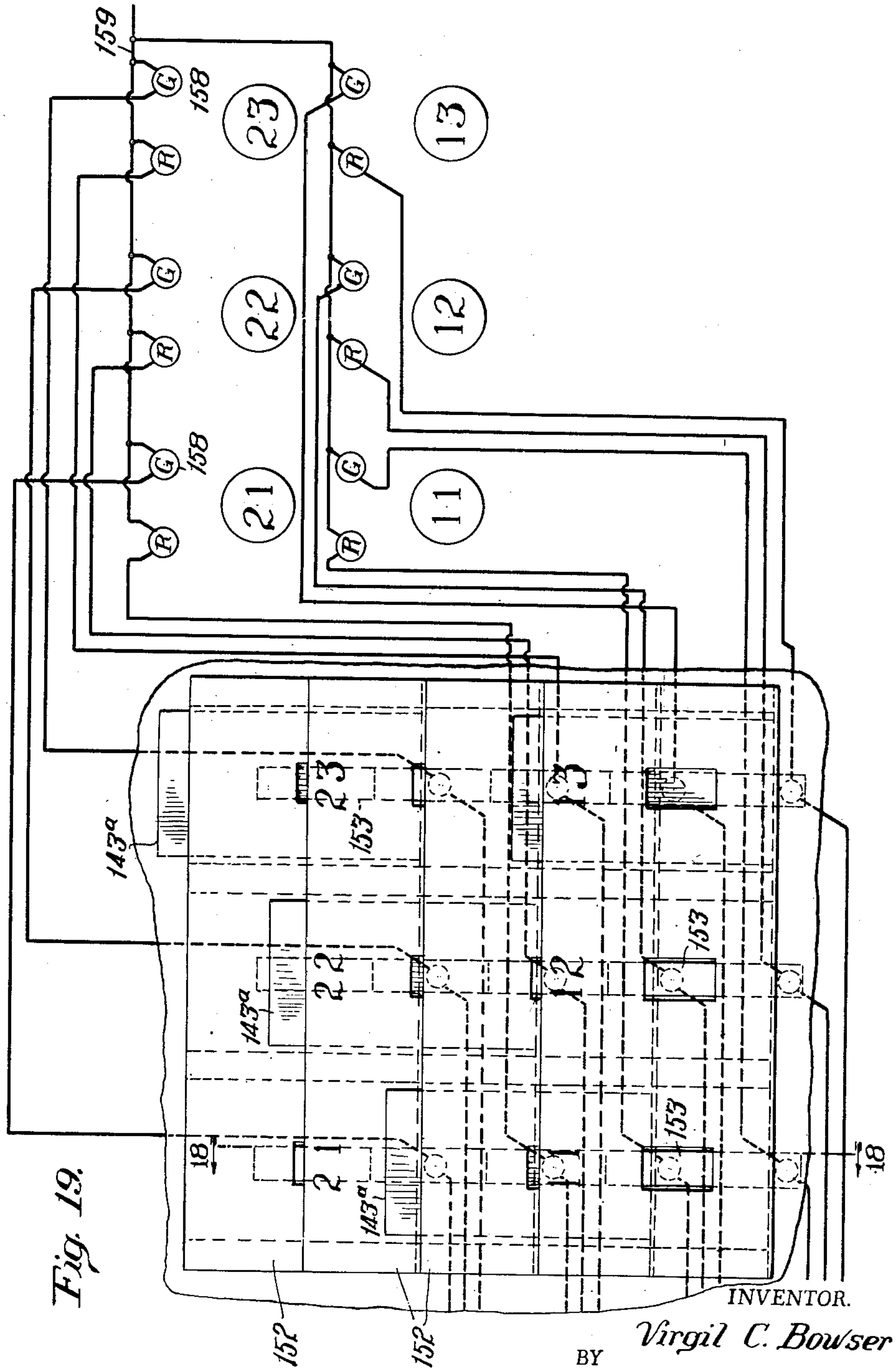
Figure 19 is a diagrammatic view of the stub panel located in the elevator car.

The elevator panel which is shown in Figs. 18 and 19 is constructed similarly to the cashier's panel in that it also contains tiers of inclined face plates 152, said tiers being in turn divided into compartments labeled in the same manner as the compartments of the cashier's stub panel. As will be seen in Fig. 18 the normal position of the electrical contacts in the elevator panel is in an open position. When a stub $143^a$ is inserted in one of the compartments in this panel the contact arm 153 is moved out of the aperture in the face plate causing the free end of the arm to move away from the panel board and engage with a mating contact tab 154. This procedure obviously closes the circuit. The lead 155 which is soldered to the end of the contact arm 153 is connected to the wire coming from the corresponding stub panel in the cashier's office. The lead 156 which is held by bolt terminal 151 on the elevator panel is connected to a line which passes through one of the small pilot lights 158 located on the control button panel in the elevator. Each pilot light is in turn connected to a common return line 159 which completes the electrical circuit.

As will be seen in Fig. 19, associated with each push button on the control panel there are two small pilot lights. These pilot lights are of different colors preferably red and green in order to afford an easy method of visually distinguishing whether the automobile desired to be delivered is located in the front or rear stall. One colored light would be obviously connected to the lead line from a compartment marked "Rear Stall," the other light being connected to the lead line from a second compartment when the stub panel is marked "Front Stall," and on each of the stub panels there are interrelated compartments representing front and rear stalls for each parking space through the building.

In the operation of my parking system there are employed a checker, an elevator operator and a cashier. The checker receives the vehicles to be parked, and inquires from the driver the length of time which the vehicle is to remain in the garage. The elevator operator drives the vehicle on and off of the elevator, operates the elevator, and drives the vehicles into and out of the parking stalls. The cashier receives payment from the vehicle operators when they return and request their vehicle, and also through means of the annunciator system signals the elevator operator to return the vehicle to the ground floor where it may be received by the vehicle operator.

The checker is provided with three-part tickets. When a vehicle operator drives into the garage to park his vehicle, the checker assigns an empty parking stall to the vehicle and writes down the number of the stall on each part of the three-part ticket. The checker gives one part of the ticket to the customer, places one part under the windshield wiper blade of the vehicle and sends the third part of the ticket to the cashier, who places his portion in the proper stub compartment in the cashier's office.

When the elevator is at the ground floor and ready to receive the vehicle, the elevator operator walks out to the vehicle, detaches the ticket from the windshield wiper, and drives the vehicle into the elevator car. The operator then notes the parking stall in which the vehicle is to be parked and reaches out of the vehicle to depress the button having the identifying symbol thereon corresponding to the stall location for the stall in which the vehicle is to be parked. The stall locations are identified by number and are written on the three-part ticket by the checker. The particular stall may be identified by colors, such as red or blue. If colors are used red may be employed to indicate a stall at one end of the elevator, blue the stall at the opposite end. The stalls may be termed front and rear stalls, respectively. Additional colors may be used to indicate that the vehicle is to be placed at the far end of the stall where the stalls are of sufficient depth to park two vehicles.

When the button is pressed by the operator the elevator car is immediately taken to the proper stall location. The elevator operator then depresses a push button on the elevator control panel which operates the gates on the elevator and at the stall. After the gates have been raised the vehicle may be driven into the particular stall in which it is to remain until requested by the vehicle operator.

The elevator operator then returns to the elevator and places his portion of the three-part ticket in the stub compartment of the stub rack contained in the elevator corresponding to the stub compartment in the cashier's office in which the cashier has previously placed his part of the ticket. The operator can then return the elevator to the ground floor to receive another vehicle or direct the elevator to a stall location to retrieve a vehicle and deliver it to the vehicle operator.

As stated previously, the cashier's office stub compartment is wired in series with the elevator car stub compartment and to the annunciator light. The insertion of the stub in the office rack opens a normally closed contact in the light circuit. The insertion of the stub in the elevator car rack closes a normally open contact in the same circuit. When the cashier places his portion of the ticket in the stub panel compartment, a contact in the circuit to a signal light is broken. The placing of the ticket stub in the compartment in the elevator car operates to close a contact in the circuit for the same signal light. The signal light corresponds to the particular stall in which the vehicle has been placed, in accordance with the information written thereon by the checker, and is associated with the push button for the stall location at which the stall appears. If the vehicle were placed in the rear stall the stub is placed in the rear stall compartment of the stub panel for the particular stall location.

The annunciator system functions to detect errors of the elevator operator and cashier. If the elevator operator has placed the vehicle in the wrong stall therefore placing his stub in the wrong stub compartment, a signal light will appear immediately on his control panel. Also, if the cashier has placed his stub in the wrong stub compartment a light will appear on the elevator car operator's control panel. In either case the elevator operator will receive an indication that something is wrong. By use of inter-communication equipment, such as telephone, the elevator operator and cashier can straighten out the difficulty and place the vehicle and stubs in the proper location. In the ordinary course of operation, however, communication between the elevator operator and the cashier is not necessary.

It should be remembered that each push button in the control panel corresponds to a particular stall location in the building, and the stall location number or other symbol appears on each push button. Also, each push button has associated therewith pilot lights forming part of the annunciator system. If the garage has front and rear stalls each of a depth sufficient only to park a single vehicle, there will be two pilot lights associated with each push button. One of the pilot lights associated with each push button may be colored red and the other green. In any event, one of the pilot lights serves to indicate the front stall at the stall location, and the other pilot light the rear stall. The pilot lights forming part of the annunciator system are thus correlated to the push button for the particular stall location at which the stalls represented by the pilot lights are located.

When the vehicle operator returns for his vehicle, he presents his claim check which is his portion of the three-part ticket, to the cashier. The cashier computes the charge and receives payment. But before doing so he removes his stub or portion of the same three-part ticket. Upon removal, one of the pilot lights on the elevator control panel will become illuminated and signal the elevator operator that the vehicle located in the particular stall indicated by the pilot light, and at the particular stall location corresponding to the push button with which the pilot light is associated, is to be brought down to ground level and turned over to the vehicle operator. The elevator operator thereupon need only to depress the push button associated with the lighted signal lamp and the elevator car is moved to the proper stall location. As the elevator car is being moved to the stall location, the elevator operator removes his portion or stub of the three-part ticket from the stub rack in the elevator car. When he does so the signal light will extinguish. If he has removed the wrong ticket, the signal lamp in the elevator car will not become extinguished, and the elevator operator will know that he has either directed the elevator car to the wrong location, which would not occur if he depresses the push button associated with the signal lamp, or that he has, for example, removed the stub for the vehicle parked in the front stall at the proper location when he should have removed the stub for the vehicle at the rear stall. The elevator operator can immediately replace the stub he has removed and withdraw the proper one. When the elevator car reaches the proper stall location the elevator operator depresses the button operating the gates, retrieves the vehicle and returns it to the ground floor.

When a stall location push button is depressed, there is simultaneous movement of both the elevator car and the shaft framework. This creates diagonal movement of the elevator car whenever the elevator car is not alined with the floor or the tier in which the particular stall location appears. The elevator control panel is positioned so that the elevator operator need not get on or off a vehicle which he drives onto the elevator car. When a vehicle is received for storage, the elevator operator drives the vehicle onto the elevator car, reaches out the vehicle window and presses the proper stall location button. Likewise, when a vehicle is being returned to the ground floor the elevator operator drives the vehicle onto the elevator car, reaches out of the vehicle window, and presses the button returning the elevator car to the ground floor. The elevator gate control buttons as well as the stop buttons, which are provided for emergency, can also be operated by the elevator operator by reaching out of the vehicle window.

From the above description it will be seen that I have devised a novel system for parking automobiles wherein a minimum area of expensive land can be utilized to park a maximum number of automobiles at one time.

The provision of a vertically moving elevator car and a laterally moving crane and elevator framework which operate simultaneously affords a means for depositing and retrieving each automobile in an absolute minimum of time and, therefore, prevents the usual "jamming" of the parking service during critical rush hour periods throughout the day.

The novel control panel wherein a single push button only is needed to be depressed in order to obtain the required vertical and lateral movement and position the elevator car at a desired parking stall is an additional means to provide a more rapid means for parking cars. This simplified control means along with my fool-proof annunciator system allows each car to be effectively deposited and returned by a single operator without an undue amount of skill or ability required on his part.

The entire parking system is not only highly economical insofar as conservation of valuable space is concerned, but has the further economical advantage in the reduction of operational expenditures due to the fact that this system can be effectively carried out by fewer personnel than other parking systems in use today.

While one form of my garage has been shown for the purpose of illustration, it will be understood that modifications as to form and structure may be made without departing from the scope of the invention as set forth in the pending claims.

I claim:

1. In combination with a storage building for automobiles having a plurality of floors containing individual parking stalls and provided with a hatchway extending through said floors and lengthwise thereof, a traveling crane at the top of said hatchway and having an elevator guide frame suspended therefrom in a central position of the hatchway, an elevator car carried in said guide frame, vertically movable opposing end gates mounted on said car, vertically movable gates closing the entrance to each of said parking stalls, a dog carried at the bottom of each end gate of said car, said dog being movable horizontally to project beneath a predetermined adjacent stall gate, operating means connected to said dog to simultaneously raise the juxtaposed car gate and stall gate and a reversible drive means carried within said elevator car for activating said raising means.

2. In combination with a storage building for automobiles having a plurality of floors containing individual parking stalls and provided with a hatchway extending through said floors and lengthwise thereof, a traveling crane at the top of said hatchway and having an elevator guide frame suspended therefrom in a central position of the hatchway, an elevator car carried in said guide frame, vertically movable opposing end gates mounted on said car, vertically movable gates closing the entrance to each of said parking stalls, a dog carried at the bottom of each end car gate, said dog being movable horizontally to project beneath a predetermined adjacent stall gate, a toggle journally supported on each of said car gates and having an arm thereon connected to said dog, a cable connected to said toggle to vertically move said car gate and stall gate simultaneously, a cable drum fixed to said elevator car, a reversible motor for driving said drum and a circuit breaking means associated with said doors to prevent movement of the elevator when said doors are in a raised position.

3. In combination with a storage building for automobiles having a plurality of floors containing individual parking stalls, and provided with a hatchway extending through said floors and lengthwise thereof, an elevator car within the hatchway and means for moving said car diagonally in the plane of said hatchway, a stub panel located on the ground floor of said building, said panel comprising stub-receiving compartments each representing an individual parking stall, means within said compartments responsive to the insertion of a stub to break an electrical contact, corresponding stub receiving compartments located in said elevator and having means therein responsive to the insertion of a stub to make an electrical contact, wiring circuits connecting the contacts of said corresponding compartments, each of said circuits having a signal means connected thereto and located in the elevator car, whereby the elevator operator is directed when a circuit is closed.

4. In combination with a storage building for automobiles having a plurality of floors containing individual parking stalls, and provided with a hatchway extending through said floors and lengthwise thereof, an elevator car within the hatchway and means for moving said car diagonally in the plane of said hatchway, a stub panel located on the ground floor of said building, said panel comprising stub-receiving compartments each representing an individual parking stall, means within said compartments responsive to the insertion of a stub to break an electrical contact, corresponding stub receiving compartments located in said elevator and having means therein responsive to the insertion of a stub to make an electrical contact, wiring circuits connecting the contacts of said related compartments, a plurality of signal lights in said elevator car, each of said lights being connected to one of said wiring circuits to visually direct the elevator operator when a circuit is closed.

5. In combination with a storage building for automobiles having a plurality of floors containing individual parking stalls, and provided with a hatchway extending through said floors and lengthwise thereof, an elevator car within the hatchway and means for moving said car diagonally in the plane of said hatchway, a stub panel located on the ground floor of said building, said panel comprising stub-receiving compartments each representing an individual parking stall, means within said compartments responsive to the insertion of a stub to break an electrical contact, corresponding stub receiving compartments located in said elevator and having means therein responsive to the insertion of a stub to make an electrical contact, wiring circuits connecting the contacts of said related compartments, each of said circuits having a signal means connected thereto and located in the elevator car, whereby the elevator operator is directed when a circuit is closed.

6. In combination with a storage building for automobiles having a plurality of floors containing individual parking stalls, and provided with a hatchway extending through said floors and lengthwise thereof, an elevator car within the hatchway and means for moving said car diagonally in the plane of said hatchway, a stub panel located on the ground floor of said building, said panel comprising stub-receiving compartments each representing an individual parking stall, means within said compartments responsive to the insertion of a stub to break an electrical contact, corresponding stub receiving compartments located in said elevator and having means therein responsive to the insertion of a stub to make an electrical contact, wiring circuits connecting the contacts of said related compartments, a plurality of signal lights in said elevator car, each of said lights being connected to one of said wiring circuits to visually direct the elevator operator when a circuit is closed.

7. In combination with a storage building for automobiles having a plurality of floors containing individual parking stalls, and provided with a hatchway extending through said floors and lengthwise thereof, an elevator car within the hatchway and means for moving said car diagonally in the plane of said hatchway, a panel located on the ground floor of said building, said panel comprising article-receiving compartments each representing an individual parking stall, means within said compartments responsive to the insertion of an article to break an electrical contact, corresponding article-receiving compartments located in said elevator and having means therein responsive to the insertion of an article to make an electrical contact, wiring circuits connecting the contacts of said related compartments, each of said circuits having a signal means connected thereto and located in the elevator car, whereby the elevator operator is directed when a circuit is closed.

8. In combination with a storage building for automobiles having a plurality of floors containing individual parking stalls, and provided with a hatchway extending through said floors and lengthwise thereof, an elevator car within the hatchway and means for moving said car diagonally in the plane of said hatchway, a panel located on the ground floor of the building, said panel containing a plurality of control devices each representing an individual parking stall, means within said control devices operable to break an electrical contact upon insertion of an object, corresponding control devices located on a panel in said elevator and having means therein operable to make an electrical contact upon insertion of an object, wiring circuits connecting the contacts of said related control devices, each of said circuits having a signal means connected thereto and located in the elevator car, whereby the elevator operator is directed when a circuit is closed.

9. In combination with a storage building for automobiles having a plurality of floors and parking stall locations and provided with a hatchway extending through said floors and lengthwise thereof, a traveling crane supported at the top of said hatchway and having an elevator guide frame suspended therefrom in a central position of the hatchway, an elevator car carried in said guide frame, drive means carried by the crane for effecting lateral movement of said crane, a second drive means for effecting vertical movement of the elevator, a control panel mounted in said elevator, electrical wiring circuits associated with said panel, means located on said panel to simultaneously activate said first and second mentioned drive means through said circuits, each of said means on said panel serving to initiate movement of said car to a particular stall location, means in each of said circuits to regulate said driving means in order to position the elevator car at a predetermined parking stall location, illuminator signal means associated with each of said means on said panel, and additional circuit control means associated with said panel for controlling illumination of each of said signal means, said additional circuit control means comprising parking ticket stub compartments having switch means operable by insertion and withdrawal of ticket stubs to make and break the circuit comprising said signal means, and additional circuit control means for controlling illumination of each of said signal means located remote from said panel, the last named means including parking ticket stub compartments having switch means operable by insertion and withdrawal of ticket stubs to make and break the circuit comprising said signal means.

10. In combination with a storage building for automobiles having a plurality of floors and parking stall locations and provided with a hatchway extending through said floors and lengthwise thereof, a traveling crane supported at the top of said hatchway and having an elevator guide frame suspended therefrom in a central position of the hatchway, an elevator car carried in said guide frame, drive means carried by the crane for effecting lateral movement of said crane, a second drive means for effecting vertical movement of the elevator, a control panel mounted in said elevator, push buttons movably mounted in said panel, each of said push buttons having normally open pairs of contacts related therewith and movable to closed position by movement of the related push button, one of said pairs of contacts upon closing causing operation of the first-mentioned drive means when the crane is properly positioned, another of said pairs of contacts upon closing causing operation of the second drive means when said car is properly positioned, each push button corresponding to a parking stall location, and illuminator signaling means associated with each of said push buttons, said means comprising a pilot light, and a circuit for operating said pilot light, said circuit being normally conditioned to maintain said light inoperative, means in said car operable to condition said circuit for operation of said light and additional means remote from said car operable to operate said light when said circuit is conditioned for operation of said light, said means remote from said car including a stub compartment having a switch associated therewith and constructed to guide a stub inserted therein into operative relationship with said switch for actuation thereof.

11. In combination with a storage building for automobiles having a plurality of floors and parking stall locations, and provided with a hatchway extending through said floors and lengthwise thereof, a traveling crane supported at the top of said hatchway and having an elevator guide frame suspended therefrom in a central position of the hatchway, an elevator car carried in said guide frame, drive means carried by the crane for effecting lateral movement of said crane, a second drive means for effecting vertical movement of the elevator, a control panel mounted in said elevator, electrical wiring circuits associated with said panel, means located on said panel to simultaneously activate said first and second mentioned drive means through said circuits, each of said means on said panel serving to initiate movement of said car to a particular stall location, selector means in each of said circuits to regulate each of said drive means in order to position the elevator car at a predetermined parking stall location, illuminator signal means associated with each of said means on said panel, and additional circuit control means associated with said panel for controlling illumination of each of said signal means to indicate the parking stall location of an automobile to be delivered, said additional circuit control means comprising parking ticket stub compartments having contacts for making and breaking a circuit including said signal means operable by insertion of parking ticket stubs into said compartment.

12. In combination with a storage building for automobiles having a plurality of floors having parking stalls and provided with a hatchway extending through said floors and lengthwise thereof, a traveling crane supported at the top of said hatchway and having an elevator guide frame suspended therefrom in a central position of the hatchway, an elevator car carried in said guide frame, drive means for independently effecting lateral movement of said crane and vertical movement of the elevator, an electric circuit control means for simultaneously activating said independent drive means, a stub panel located on the ground floor of said building, a second stub panel located in the elevator car, said stub panels each having compartments corresponding to stalls in said building, wiring circuits connecting said panels and means responsive to insertion and withdrawal of the stubs in said compartments to complete said circuits, each of said circuits having a signal means connected thereto and located in the elevator car, whereby the elevator operator is directed when a circuit is closed.

13. In combination with a storage building for automobiles having a plurality of floors containing individual parking stall locations and provided with a hatchway extending through said floors and lengthwise thereof, a traveling crane supported at the top of said hatchway and having an elevator guide frame suspended therefrom in a central position of the hatchway, an elevator car carried in said guide frame, drive means carried by the crane for effecting movement of said crane, a second drive means for effecting vertical movement of the elevator, means for controlling both said drive means for moving said car vertically and horizontally in said hatchway simultaneously and for moving said car from any one of said stall locations to any other of said stall locations directly by simultaneous movement of said car in vertical and horizontal directions, and for automatically positioning said car at any one of said stall locations comprising a control panel mounted in said elevator, electrical wiring circuits connecting each of said independent drive means to said panel, a plurality of apertures in the panel, a push-button in each of said apertures, each push-button being associated with separate contact means for activating each of said drive means and each push-button corresponding to one of said stall locations, and a selector means located in each circuit to limit motion of said independent drive means in accordance with the specific push-button depressed.

VIRGIL C. BOWSER.

References Cited in the file of this patent

UNITED STATES PATENTS

| Number | Name | Date |
|---|---|---|
| 292,989 | Clark | Feb. 5, 1884 |
| 356,650 | Landgraf | Jan. 25, 1887 |
| 994,218 | Thrasler | June 6, 1911 |
| 1,288,567 | Hall | Dec. 24, 1918 |
| 1,330,412 | Thurston | Feb. 10, 1920 |
| 1,340,145 | Blair et al. | May 18, 1920 |
| 1,554,584 | Lake | Sept. 22, 1925 |
| 1,614,905 | Tunison | Jan. 18, 1927 |
| 1,779,998 | Beecher et al. | Oct. 28, 1930 |
| 1,969,002 | Gleichman | Aug. 7, 1934 |
| 2,204,023 | Mason | June 11, 1940 |
| 2,338,582 | Hadsel | Jan. 4, 1944 |
| 2,511,619 | Bowser | June 13, 1950 |